Jan. 24, 1933.  M. B. MORGAN  1,895,168
AUTOMOTIVE DRIVING AXLE
Filed July 18, 1931  3 Sheets-Sheet 3

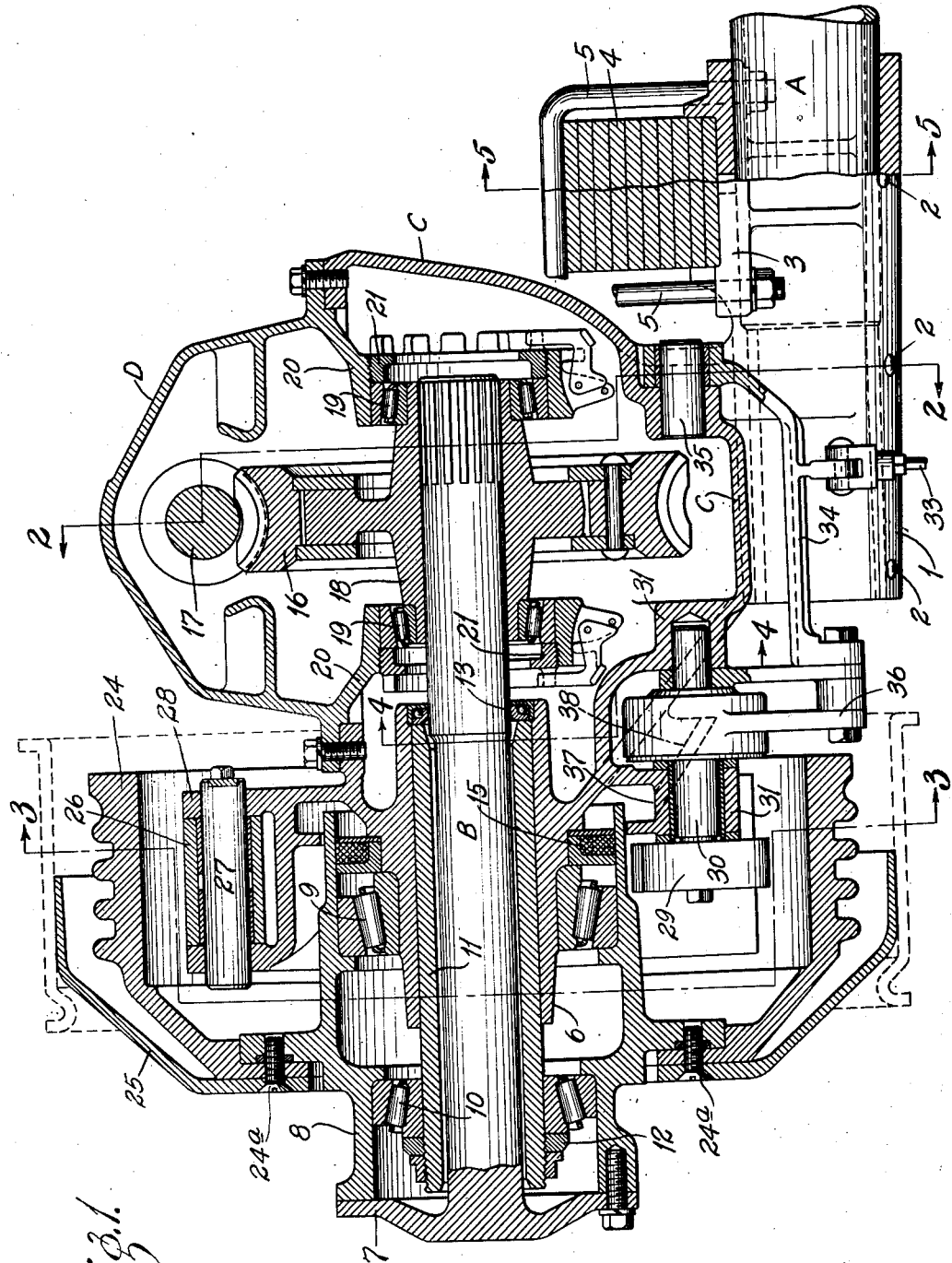

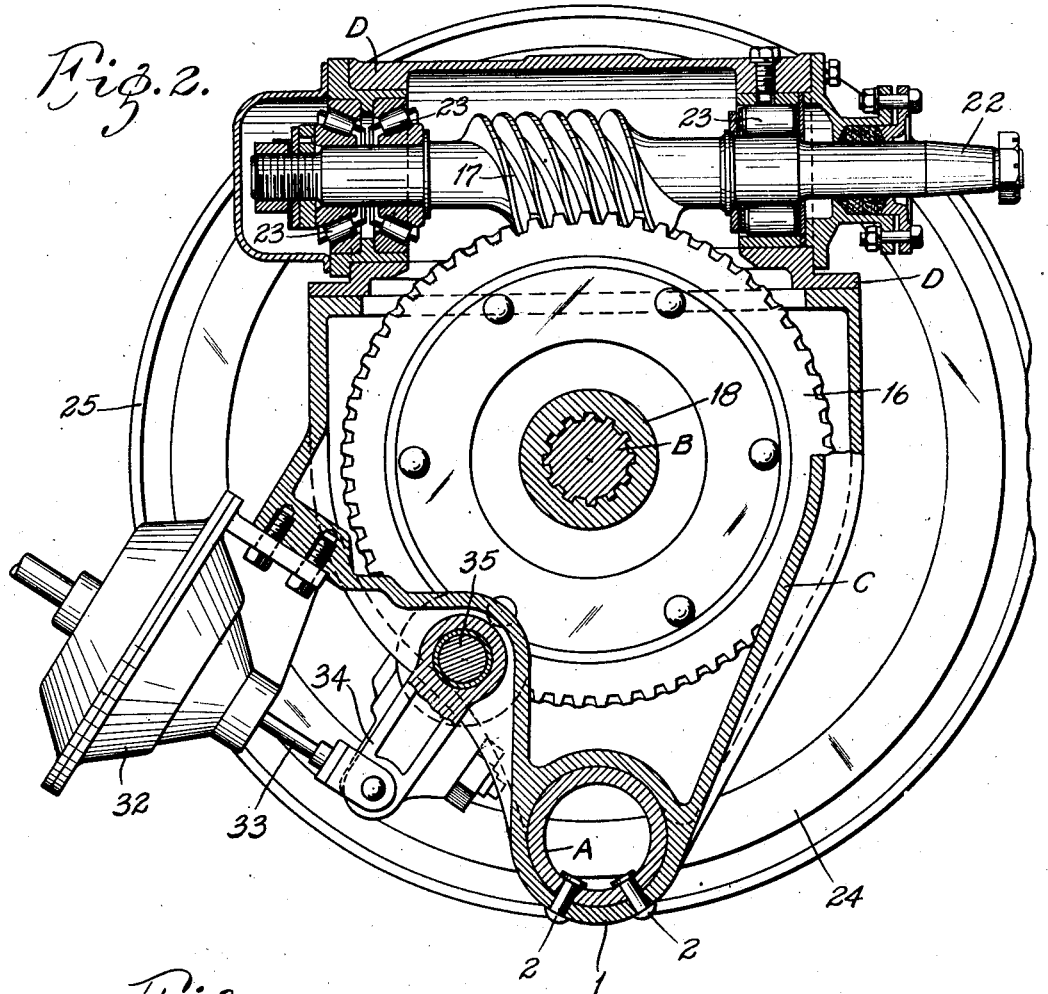
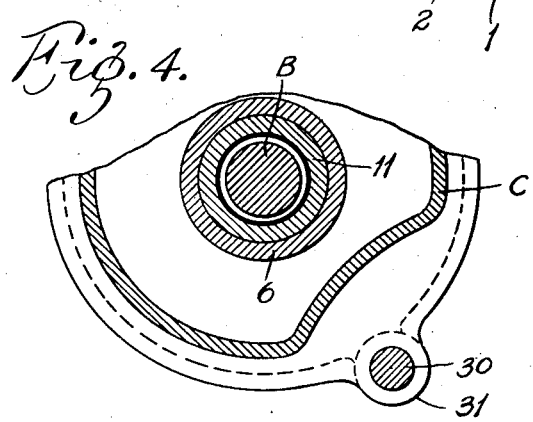

INVENTOR:
Mathew B. Morgan

HIS ATTORNEYS

Patented Jan. 24, 1933

1,895,168

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

AUTOMOTIVE DRIVING AXLE

Application filed July 18, 1931. Serial No. 551,691.

This invention relates to automotive driving axles of the drop axle type, wherein the wheels are driven by separate power units. The principal objects of the present invention are to provide for simplicity and cheapness of construction of such axles; to facilitate assembly and disassembly of the parts; to provide for the proper housing, lubrication and support of the gearing and live axle sections; to provide a removable carrier for the gearing; and to produce a strong, compact and durable axle. The invention consists in the parts and in the arrangements and combinations of parts hereinafter described and claimed.

Figure 3:
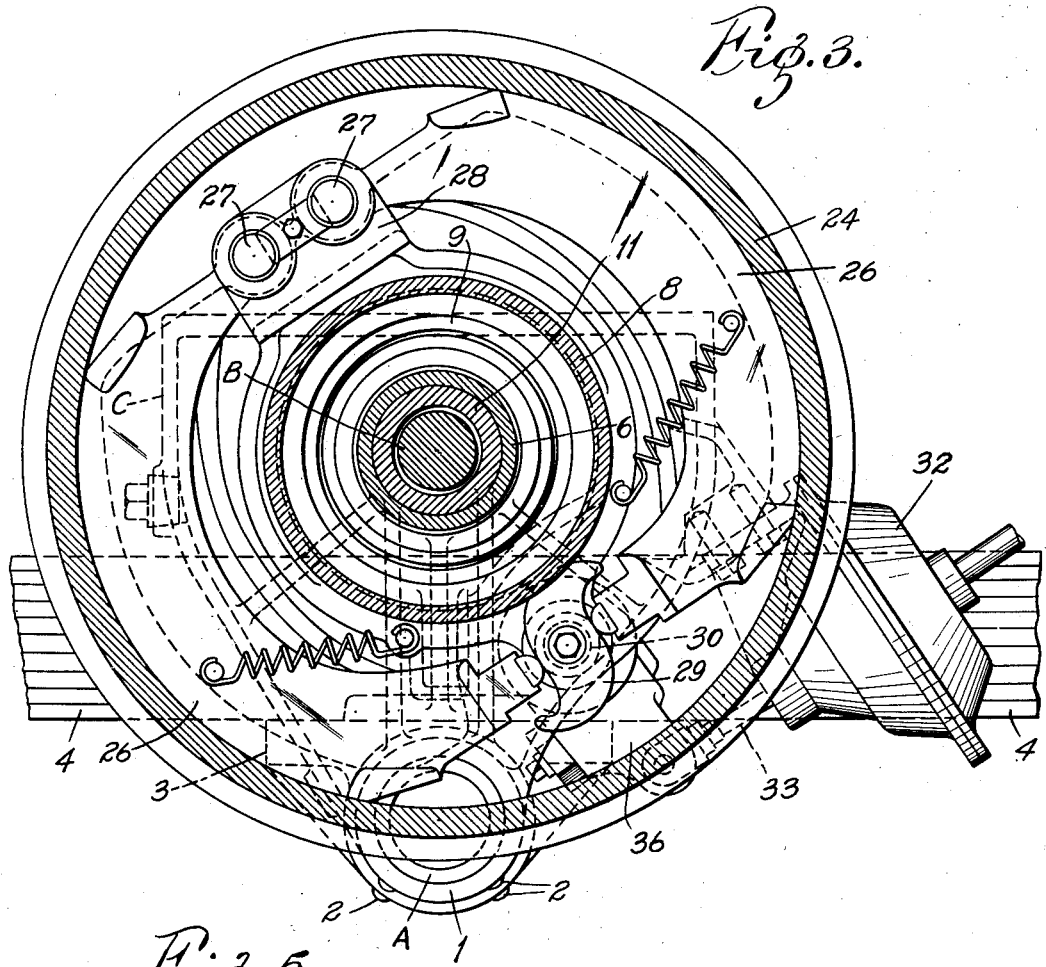
Figure 5:
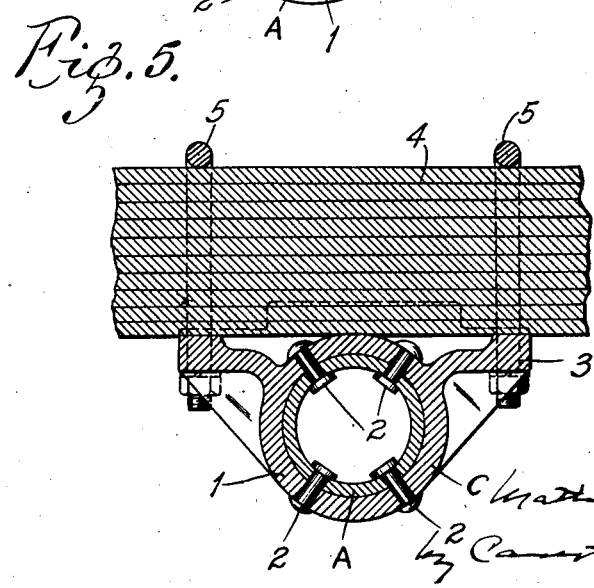

In the accompanying drawings, which form part of this specification and wherein like symbols refer to like parts wherever they occur, Fig. 1 is a vertical central longitudinal section through one end portion of an automotive driving drop axle construction embodying my invention, Fig. 2 is a vertical transverse section on the line 2—2 in Fig. 1, Fig. 3 is a vertical transverse section on the line 3—3 in Fig. 1, Fig. 4 is a fragmentary vertical transverse section on the line 4—4 in Fig. 1; and Fig. 5 is a vertical transverse section on the line 5—5 in Fig. 1.

My axle belongs to the type of automotive driving axle known as a drop axle and comprises a fixed load supporting axle A provided at each end with a full-floating live axle B that is located above and extends beyond the fixed axle and is preferably driven by a separate power unit. The drawings show only only end of the axle construction, but it will be understood that the construction of the other end is like that shown.

In the present drop axle construction, the fixed axle A comprises a tubular member; and the live axle B is mounted in a bracket or housing member C that is secured to the end of the fixed axle and is provided with a chamber adapted to receive, through an opening, preferably in the top thereof, the gearing for driving said live axle. A gear carrier D is removably secured to the top of the housing member C and supports the driving gearing for the live axle B, the gear carrier covering the opening at the top of the chamber in said housing member. The end portion of the fixed axle A is slightly tapered and has a drive fit in a tapered horizontal bore provided therefor in a sleeve portion 1 formed on the underside of the housing member C. The housing member C is further rigidly secured to the tapered end of the fixed axle by means of rivets 2 that pass through said fixed axle and the sleeve portion 1 on the lower end of said housing member. The sleeve portion 1 of the housing member extends inwardly beyond the inner side of said housing and is provided with a spring seat 3 to which a body supporting side spring 4 is secured by means of the usual U-bolts 5.

The live axle A extends through a horizontally disposed sleeve or tubular projection 6 on the outer side wall of the housing member C and is provided at its outer end with a driving disk 7 that is removably secured to the outer end of a tubular wheel hub 8 that surrounds the outer portion of said tubular projection. The wheel hub 8 is rotatably supported on the tubular projection 6 of the housing member C by means of anti-friction bearings, preferably tapered roller bearings 9 and 10, respectively. One of these bearings 9 is interposed between the inner end portion of the wheel hub 8 and the tubular projection 6 on the housing member C; and the other bearing 10 is interposed between the outer end portion of said wheel hub and the projecting outer end portion of a sleeve 11 that is press-fitted in said tubular projection. The bearings 9 and 10 are adjusted by means of an adjusting nut 12 threaded on the outer end of the sleeve 11 in abutting relation to the cone or inner raceway member of the outermost hub bearing 10. A suitable oil seal 13 is mounted in the inner end of the tubular live axle receiving portion 6 of the housing for preventing the escape of oil from the housing at this point; and likewise, the inner end of the wheel hub 8 is equipped with an oil seal 15 for preventing the escape of oil from the wheel hub.

The gearing for driving the live axle B comprises a worm gear 16 splined thereon and an overhung worm 17 intermeshing with said worm gear, the worm and worm gear being mounted in the gear carrier D in proper intermeshed relation and being removable from the housing C with the carrier as a unit. The worm gear 16 has an elongated hub portion 18 that is journaled at its opposite ends in tapered antifriction bearings 19 provided therefor in pedestals 20 that depend from the gear carrier D. Preferably both of these pedestals are split to facilitate mounting of the worm gear 16 in the carrier. The conical bearings 19 are adjusted by means of adjusting rings 21 that are threaded into the pedestals 19 in abutting relation to the large ends of the conical outer bearing members or cups of said bearings. The worm 17 is formed integral with a propeller shaft 22, which is rotatably supported at its opposite ends in suitable antifriction bearings 23 provided therefor in the upper portion of the gear carrier.

Removably secured to the wheel hub 8 by means of screws 24a is a brake drum 24. The securing screws 24a for the brake drum also serve to secure the disk portion 25 of the wheel to the wheel hub. Cooperating with the inner surface of the brake drum 24 is a pair of brake shoes 26 that are pivoted at one end upon pins 27 mounted in a bracket 28 formed integral with the outer side wall of the housing member C. The brake shoes 26 are operated by means of a suitable cam 29 on a shaft 30 journaled in bearings 31 provided therefor in the outer side portion of said housing member. The cam shaft 30 is preferably actuated by means of a fluid motor 32 which is bolted to the housing and has a stem 33 operatively connected to a yoke 34, one branch of which is journaled on a stud 35 and projects from the inner side wall of the housing in axial alinement with the cam shaft and the other branch of which is bolted to an arm 36 operatively connected to the cam shaft.

The housing member C is provided adjacent to the inner end of the wheel hub 8 with an annular groove 37, which is provided at its bottom with a discharge passageway 38 that extends inwardly beyond the inner edge of the brake drum 24. By this arrangement, any oil that escapes from the wheel hub 8 will drip into the annular oil receiving groove 37 and will flow from said groove into the outlet port 38 and be discharged clear of the brake drum, thereby preventing such oil from reaching the brake shoes and interfering with the operation of the brake.

The hereinbefore driving axle construction has numerous advantages. The bracket or housing member C on the end of the fixed axle serves as a support for the wheel hub bearings 9 and 10, the brake drum 24 and the brake shoes 26 and operating parts therefor. It also provides a seat for the spring 4; and it also serves as a lubricant containing housing for the worm gearing for driving the live axle B. The worm and worm gear are mounted in a separate carrier in proper intermeshed relation and can be quickly and easily attached to and removed from the housing member with the gear carrier as a unit without disturbing the relative positions of said worm and worm gear. The gear carrier is a standard gear carrier of the kind used with ordinary automotive driving axles and is thus adapted to be used interchangeably with such axles and drop axles of the kind described.

It is obvious from the foregoing description that the work of mounting and dismounting and adjusting the parts is greatly simplified by my invention and in comparison with the practice heretofore customary. It is also obvious that the new construction is more compact and strong and less liable to get out of order than earlier constructions. It is noted as an important advantage of my invention that the worm gearing may be removed from the housing member without removing the wheel, its bearings or the vehicle spring, merely by disconnecting the driving disk of the live axle from the wheel hub and drawing said axle out far enough to disengage the inner end thereof from the hub of the worm gear.

What I claim is:

1. An automotive driving axle comprising a fixed axle, a housing member mounted on each end of said fixed axle, a live axle mounted in said housing, gearing in said housing for driving said live axle, and a carrier for said gearing removably secured to said housing member, said carrier being removable from said housing member in a plane perpendicular to said axle.

2. An automotive driving axle comprising a fixed axle, a housing member mounted on each end of said fixed axle, a live axle mounted in said housing, a worm gear in said housing and fixed to said live axle, a carrier for said worm gear removably secured to said housing member, and a worm journaled in said carrier and intermeshing with the worm wheel carried thereby, said worm and worm gear being removable from said housing with said carrier as a unit in a plane perpendicular to said axle.

3. An automotive driving axle comprising a fixed axle, a housing secured to one end thereof, a live axle supported in said housing, gearing in said housing for driving said live axle, said housing having an opening extending through one wall thereof in a direction transverse to the axle axis and through which said gearing is adapted to be inserted in and removed from said housing, and a member for closing the gear receiving opening in said housing, said gearing being supported in said member so as to be removable therewith from said housing as a unit.

4. An automotive driving axle comprising a fixed axle, a housing secured to one end thereof, a live axle supported in said housing above said fixed axle worm gearing in said housing for driving said live axle, said housing having an opening in the top thereof through which said worm gearing is adapted to be inserted in and removed from said housing, and a member for closing the gear receiving opening in said housing, said worm gearing being supported in said member so as to be removable therewith from said housing as a unit.

5. An automotive axle comprising a fixed axle, a housing member secured to each end thereof, a live axle mounted in said housing member, a wheel hub journaled on said housing member and operatively connected to said live axle, gearing in said housing member for driving said live axle, and a member removably secured to said housing member and supporting said gearing, said member being removable from said housing member in a plane perpendicular to said axle.

6. An automotive drop axle comprising a fixed axle, a one-piece housing member secured to one end thereof, a live axle mounted in said housing member above said end of said fixed axle, a wheel hub rotatably supported on said housing member and operatively connected to said live axle, gearing in said housing member for driving said live axle, and a member removably secured to said housing member and supporting said gearing, said member being removable from said housing member in a plane perpendicular to said axle without removing the wheel hub from said housing member.

7. An automotive axle comprising a fixed axle, a one-piece housing mounted on one end thereof, a live axle mounted in said housing, a wheel hub surrounding a portion of said housing and operatively connected to said live axle, antifriction bearings mounted on said portion of said housing for rotatably supporting said wheel hub thereon, a brake drum secured to said wheel hub, brake mechanism cooperating with said drum and supported entirely by said housing, gearing located in said housing for driving said live axle, and a carrier removably secured to said housing and supporting said gearing said carrier being removable from said housing in a plane perpendicular to said axle.

8. An automotive axle comprising a fixed axle, a one-piece housing mounted on one end thereof, a live axle mounted in said housing, a wheel hub surrounding a portion of said housing and operatively connected to said live axle, antifriction bearings mounted on said portion of said housing for rotatably supporting said wheel hub thereto, a brake drum secured to said wheel hub, brake mechanism cooperating with said drum, said housing being provided with integral supporting brackets for said brake mechanism, gearing located in said housing for driving said live axle, and a carrier removably secured to said housing and supporting said gearing therein said carrier being removable from said housing in a plane perpendicular to said axle.

9. An automotive axle comprising a fixed axle, a housing secured to one end thereof and having a tubular portion formed integral with its outer side wall, a sleeve mounted in the tubular portion of said housing, a live axle extending through said sleeve portion into said housing, a wheel hub journaled on said tubular portion and said sleeve, means for connecting said live axle with said wheel hub beyond the outer end of said sleeve, a brake drum secured to said wheel hub, a worm gear located in said housing and fixed to the end of said live axle, an overhung worm intermeshing with said worm gear, and a carrier for said worm and worm gear removably secured to said housing.

10. An automotive axle comprising a fixed axle, a housing secured to one end thereof and having a tubular portion formed integral with its outer side wall and extending parallel to said fixed axle, a sleeve mounted in said tubular portion and extending beyond the outer end thereof, a live axle extending loosely through said sleeve into said housing, a wheel hub surrounding said tubular portion and said sleeve, antifriction bearings interposed between said wheel hub and said tubular portion and said sleeve, respectively, means for connecting said live axle with said wheel hub beyond the outer end of said sleeve, a brake drum secured to said wheel hub, brake mechanism cooperating with said brake drum, said housing having integral bracket portions for supporting said brake mechanism, a worm gear located in said housing and fixed to the end of said shaft, an overhung worm intermeshing with said worm gear, and a carrier for said worm and worm gear removably secured to said housing.

11. An automotive axle comprising a fixed axle, a housing secured to one end thereof and having a tubular portion formed integral with its outer side wall and extending parallel to said fixed axle, a sleeve mounted in the tubular portion of said housing, a live axle extending through said sleeve portion into said housing, a wheel hub surrounding said tubular portion and the adjacent portion of said sleeve, antifriction bearings interposed between said wheel hub and said tubular portion and said sleeve, respectively, means for connecting said live axle with said wheel hub beyond the outer end of said sleeve, a brake drum secured to said wheel hub, brake mechanism cooperating with said brake drum, said housing having integral bracket portions for supporting said brake mechanism, a worm gear located in said housing and fixed to the end of said live axle, an overhung worm intermeshing with said worm gear, and a carrier for said worm and worm gear removably secured to said housing, said housing having an annular oil groove formed therein that surrounds the inner end portion of said wheel hub and a discharge passageway leading from said annular groove and terminating inwardly of said brake drum.

12. An automotive axle comprising a fixed axle, a housing secured to one end thereof and having a tubular portion formed integral with its outer side wall, a sleeve mounted in the tubular portion of said housing and extending beyond the outer end thereof, a live axle extending through said sleeve into said housing, a wheel hub surrounding said tubular portion and the portion of the sleeve projecting from the outer end thereof, antifriction bearings mounted on said tubular portion and said sleeve for supporting the wheel hub thereon, means for connecting said live axle with said wheel hub beyond the outer end of said sleeve, a brake drum secured to said wheel hub, brake mechanism supported by said housing and cooperating with said brake drum, a worm gear located in said housing and splined on the inner end of said live axle, an overhung worm intermeshing with said worm gear, and a carrier for said worm and worm gear removably secured to said housing, said housing having an annular oil groove formed therein that surrounds the inner end of said wheel hub and an oil drain leading from said annular groove and terminating inwardly of said brake drum.

13. An automotive driving axle comprising a load supporting axle, a housing mounted on each end of said load supporting axle, a live axle mounted in said housing, a wheel located on one side of said housing and operatively connected to said live axle to be driven thereby, a vehicle spring supported by said load supporting axle on the opposite side of said housing, gearing in said housing for driving said live axle, a carrier for said gearing, and means whereby said carrier is adapted to be attached to and detached from said housing with said gearing without removing said wheel.

14. An automotive driving axle comprising a fixed axle, a housing member mounted on each end of said fixed axle, a live axle mounted in said housing member, a wheel journaled on said housing member and operatively connected to said live axle to be driven thereby, a vehicle spring secured to said housing member, gearing mounted in said housing member and operatively connected to said live axle for driving the same, and a carrier for said gearing adapted to be attached and detached from said housing member independently of said wheel.

Signed at Detroit, Michigan, this 13th day of July 1931.

MATHEW B. MORGAN.